Aug. 15, 1961        H. DANHORST        2,995,943
INFINITELY VARIABLE FRICTION GEARS
Filed April 12, 1960        2 Sheets-Sheet 1
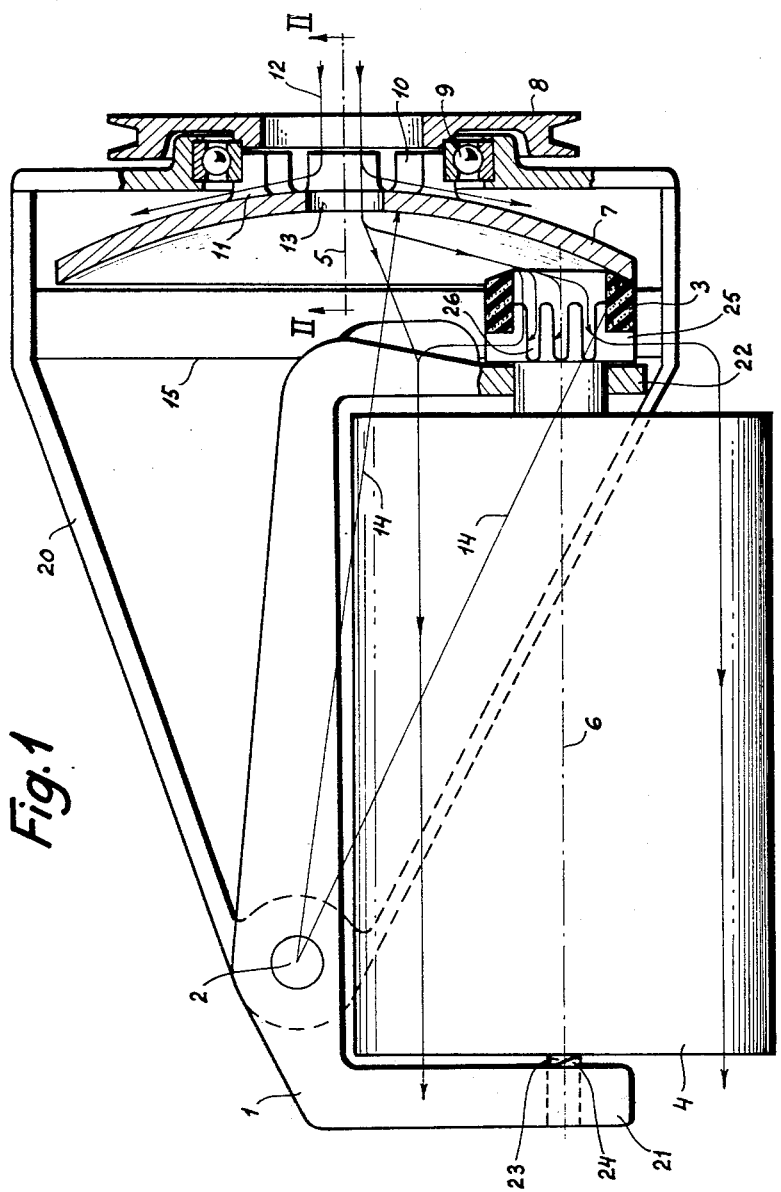
INVENTOR.
HARRY DANHORST
BY
*Imirie & Smiley*
Attys.

Aug. 15, 1961  H. DANHORST  2,995,943
INFINITELY VARIABLE FRICTION GEARS
Filed April 12, 1960  2 Sheets-Sheet 2
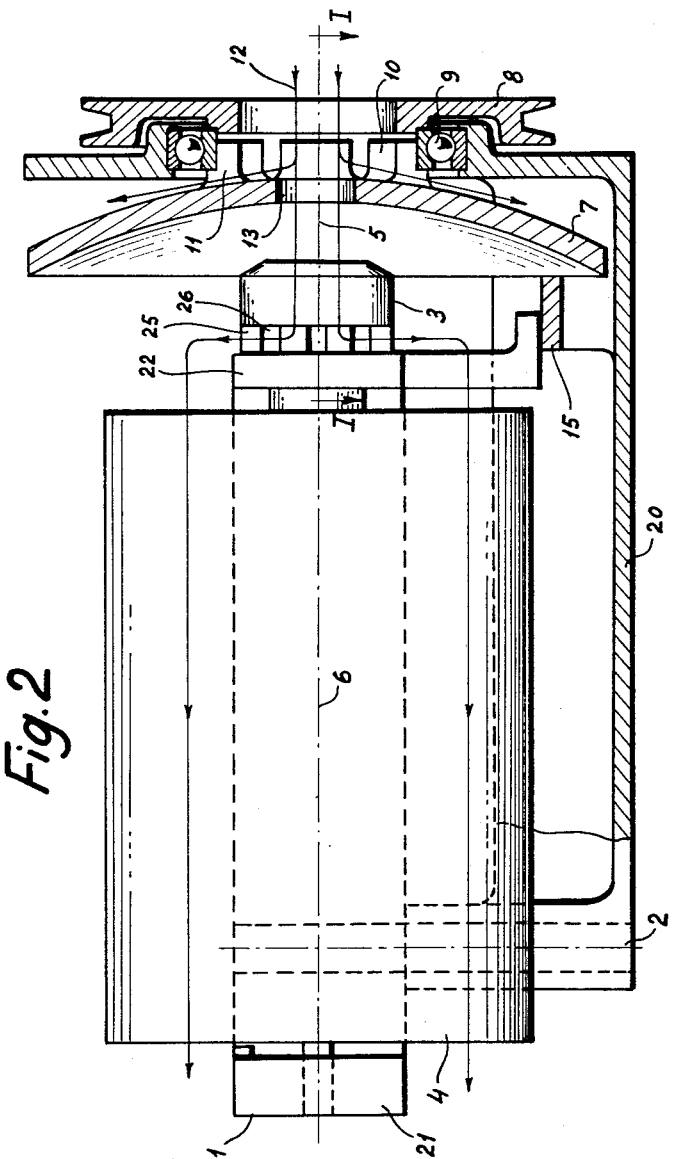
INVENTOR.
HARRY DANHORST
BY
Attys.

2,995,943
INFINITELY VARIABLE FRICTION GEARS
Harry Danhorst, 58 Tornerosevej, Herlev, Denmark
Filed Apr. 12, 1960, Ser. No. 21,661
Claims priority, application Denmark July 1, 1959
9 Claims. (Cl. 74—191)

This invention relates to infinitely variable friction gears of the type comprising a rotary driving shaft carrying a friction wheel engaging a friction disc for imparting rotary movement thereto, the driving shaft being pivotable about an axis at right angles thereto and spaced from the axis of the shaft, for varying the gearing ratio.

It is a common drawback of variable friction gears known heretofore that their efficiency is rather low, and that they can only be used with relatively low-powered engines without being deteriorated by the development of heat ensuing from the action of frictional forces set up in the gear.

It is the principal object of the present invention to provide a friction gear of the type specified which will avoid these drawbacks and which, thus, has a high efficiency comparable with that of cog-wheel gears, and high power transmission capacity.

A further object is to provide a variable friction gear having means for effectively cooling the gear during operation so as to permit transmission of high power without damage to the parts of the gear due to the development of heat.

Still another object is to provide a variable friction gear requiring a minimum of space for accommodation and having maximum power transmission capacity.

How these objects are accomplished will be shown in detail hereinafter, reference being now had to the accompanying drawing, in which:

FIG. 1 is a plan view of one preferred form of the friction gear in accordance with this invention, part of the view being a section taken along the line I—I in FIG. 2, and FIG. 2 is a side view and a part section along the line II—II in FIG. 1.

In the drawing, 20 denotes a housing or base frame in which a substantially U-shaped secondary frame 1 is adapted to pivot in a horizontal plane about the axis of a vertical trunnion 2, a guide 15 being provided in the frame 20 for supporting the frame 1 against the action of vertical forces imposed thereon during operation. The U-shaped frame 1 is, at its ends, provided with bearings 21 and 22 for receiving an electric motor 4 in such a manner that the housing of the latter is rotatable about its axis within certain limits and is also capable of limited axial displacement. The housing of the motor 4 is at the end thereof adjacent to the bearing 21 provided with a cam-shaped projection 23 which engages a similar cam-shaped projection 24 on the bearing 21 and co-operates therewith in such a manner that, when the motor housing is turned through a certain angle under the action of the reactive torque of the motor, the motor and its shaft are urged towards the right, as seen in FIGURES 1 and 2.

The shaft of the motor 4 carries a friction wheel suitably keyed thereto, which comprises a hub 25 of metal and a substantially cylindrical ring 3 secured thereto by any suitable means. The ring 3 is made of plastic wear-resisting material, such as nylon, and has one end face formed substantially as a flat, truncated cone. The hub 25 is substantially in the form of a hollow cylinder which receives the ring 3 on part of its circumference and which is formed with a plurality of radial slots 26 extending through the circumferential wall of the hub.

The conical end face of the friction wheel 3 engages the concave face of a bowl-shaped, rotatable friction disc 7 which is mounted for rotation in the casing or frame 20, as described in detail hereinafter. As will be apparent from FIGURES 1 and 2 the axis 5 of the friction disc 7 is at right angles to that of the trunnion 2 and is so situated in the casing 20 that, when the common axis 6 of the motor 4 and the friction wheel 3 is parallel to the axis 5, as shown in FIG. 1, the latter axis is situated between the axis 6 and the axis of the trunnion 2, the two axes 5 and 6 being in a common plane at right angles to the axis of the trunnion. The concave face of the friction disc 7 is formed as a spheroidic face, the arc-shaped generatrix of which has its center on the axis of the trunnion 2, as indicated by radii 14. Consequently, the friction wheel 3 will, irrespective of any pivotal movement of the frame 1 and the motor 4 about the trunnion 2, constantly engage the concave face of the friction disc 7 so as to be capable of imparting rotary movement thereto. The necesssary axial pressure of the friction wheel 3 against the friction disc 7 is produced by means of the cams 23 and 24 in the manner described hereinbefore. The resultant of the reactive forces hereby imposed upon the frame 1 will, due to the form of the friction disc, practically intersect the axis of the trunnion 2 so as to place the frame 1 under no momentum which might cause any undesired pivotal movement of the frame.

The friction disc 7 is on its convex side formed with a concentric annular projection or hub 10 which by means of screws (not shown) is secured to the disc-shaped portion of a V-belt pulley 8 to clamp the inner ring of a ball bearing 9 between them, the outer ring of which is mounted in the casing 20 in such a manner as to define the axis 5 described hereinbefore. Thus, there is no driven shaft proper, since the output from the gear is simply transmitted direct from the friction disc 7 to the V-belt pulley 8 which may drive various machinery through suitable belting. This construction insures a small overall length of the gear. The V-belt pulley 8 may, if desired, be replaced by any other suitable transmission means, such as a sprocket wheel, a gear wheel, or the like.

Provision is made for an effective air cooling of the gear. To this effect the friction disc 7 and the V-belt pulley 8 are recessed at their central portions, and the annular projection 10 of the friction disc 7 is provided with a plurality of radial slots 11 which, in operation, act as vanes which draw in air and distribute it over the convex side of the friction disc 7 to cool the latter, as indicated by arrows 12. Part of the air drawn in flows through the central aperture 13 of the friction disc to scavenge the concave side thereof. Similarly, the hub 25 of the friction wheel 3 constitutes a fan which draws in the air entering through the aperture 13 for cooling the friction wheel. If, as will normally be the case, the motor 4 is also provided with a cooling fan arranged in the motor housing, the intake opening (not shown) of such fan may suitably be arranged at the end of the motor adjacent the friction wheel 3 so that a continuous stream of air flows through the parts 8, 7, 3, 25 and 4. As a result of the presence of no less than three impellers in this flow line, the air stream and, therefore, the cooling will be very intensive.

In operation, the desired gear ratio is selected by suitably pivoting the frame 1 about the trunnion 2 so as to cause the friction wheel 3 to engage the friction disc 7 at a suitable distance from the center thereof. The maximum torque to be transmitted is limited only by the power of the motor 4, since the frictional forces acting between the friction wheel 3, and the friction disc 7 are always operative at a constant radius of the friction wheel, so that, if the friction wheel will transmit maximum torque in one position relative to the friction disc, it will also transmit the same torque in any other position. In the position of the parts shown in FIG. 1, the relative movement of the friction wheel 3 and the friction disc 7 is only to a certain degree comparable to a pure rolling movement, so that certain frictional losses are unavoidable. This is, however, compensated for by the gear ratio being in this position high so that in spite of the frictional losses a high torque is yielded at the pulley 8. On the other hand, the closer the friction wheel 3 comes to a position in which the imaginary apex of its frustro-conical side face coincides with the axis 5 of the friction disc 7, the more the relative movement of the friction wheel 3 and the friction disc 7 approximates a pure rolling movement, so that when the gear ratio is low, and maximum torque from the motor 4 may be required, the frictional losses will be negligible and an almost full transmission of the torque to the pulley 8 is obtained. Practical experiments have shown that an average mechanical efficiency of the friction gear of this invention of about 95 percent can be obtained.

The direction of rotation of the friction wheel 3 is such that the reactive torque of the motor 4 causes the latter to be urged to the right, as described hereinbefore, and that the reactive forces exerted upon the friction wheel 3 tend to press the pivotable frame 1 against the guide 15. Due to the lack of momentum tending to pivot the frame 1 on the trunnion 2, the friction between the frame 1 and the guide 15 will normally be sufficient to maintain the frame 1 in its selected position during operation. On the other hand, variation of the gear ratio is easily effected by pivoting the frame 1, since hereby practically only the frictional forces between this frame and the guide 15 have to be overcome. The friction gear of the invention is, therefore, well suited for remote control by such simple means as Bowden cable or the like.

I wish it to be understood that the invention is not limited to the specific form described hereinbefore. Thus, the prime mover of the friction gear need not be mounted in the pivotable frame 1, but may be stationarily mounted and may be adapted to drive the shaft carrying the friction wheel 3 through suitable transmission elements, such as V-belting, flexible shafts, conical gears, or the like.

I claim:

1. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face engaging a friction disc mounted in said base frame for rotation about an axis at right angles to and spaced from said pivot axis of said secondary frame, said axes of rotation of said friction disc and said friction pulley being both situated on the same side of said pivot axis, but at different distances therefrom, the distance between said pivot axis and the axis of said friction disc being smaller than the distance between said pivot axis and the axis of said friction pulley, said friction disc being formed substantially as a concave spheroidic, bowl-shaped body an arc-shaped generatrix of which has its center on said pivot axis, and means connected with said friction disc for transmitting power therefrom.

2. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face, bearing means in said base frame defining an axis of rotation at right angles to and spaced from the pivot axis of said secondary frame, said latter axis of rotation being situated on the same side of said pivot axis as the axis of rotation of said friction pulley, but at a smaller distances therefrom, a friction disc and a power transmission element arranged on either side of said bearing means in said base frame for rotation therein and secured together, said friction disc being formed substantially as a concave spheroidic, bowl-shaped body an arc-shaped generatrix of which has its center on said pivot axis, the concave side of said friction disc being frictionally engaged by the conical end face of said friction pulley.

3. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face, bearing means in said base frame defining an axis of rotation at right angles to and spaced from the pivot axis of said secondary frame, said latter axis of rotation being situated on the same side of said pivot axis as the axis of rotation of said friction pulley, but at a smaller distance therefrom, a friction disc and a power transmission element arranged on either side of said bearing means in said base frame for rotation therein and secured together, said friction disc being formed substantially as a spheroidic, bowl-shaped body an arc-shaped generatrix of which has its center on said pivot axis, the concave side of said friction disc being frictionally engaged by the conical end face of said friction pulley, said friction disc and said power transmission element being provided with central apertures.

4. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face, bearing means in said base frame defining an axis of rotation at right angles to and spaced from the pivot axis of said secondary frame, said latter axis of rotation being situated on the same side of said pivot axis as the axis of rotation of said friction pulley, but at a smaller distance therefrom, a friction disc having an annular hub engaging said bearing means in said base frame for rotation therein, said friction disc being situated on the side of said bearing means facing said pivot axis of said secondary frame, a power transmission element arranged on the opposite side of said bearing means and secured to said annular hub of said friction disc for rotation therewith, said friction disc and said power transmission element having aligned central apertures, said annular hub being formed with radial slots extending through the circumferential wall of said hub, said friction disc being formed substantially as a concave spheroidic, bowl-shaped body an arc-shaped generatrix of which has its center on said pivot axis of said secondary frame, the concave side of said friction disc being frictionally engaged by the conical end face of said friction pulley.

5. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face, said friction pulley being axially recessed and formed with radial slots extending to the circumference of said pulley to constitute a cooling fan, bearing means in said base frame defining an axis of rotation at right angles to and spaced from the pivot axis of said secondary frame, said latter axis of rotation being situated on the same side of said pivot axis as the axis of rotation of said friction pulley, but at a smaller distance therefrom, a friction disc and a power transmission element arranged on either side of said bearing means in said base frame for rotation therein and secured together, said friction disc being formed substantially as a spheroidic, bowl-shaped body an arc-shaped generatrix of which has its center on said pivot axis, the concave side of said friction disc being frictionally engaged by the conical end face of said friction pulley.

6. An infinitely variable friction gear comprising a base frame, a secondary frame mounted for pivoting movement in said base frame, bearing means in said secondary frame defining an axis of rotation at right angles to and spaced from the pivot axis of said secondary frame, a friction pulley adapted to rotate about said axis of rotation and having a substantially conical end face, said friction pulley being axially recessed and formed with radial slots extending to the circumference of said pulley to constitute a cooling fan, bearing means in said base frame defining an axis of rotation at right angles to and spaced from the pivot axis of said secondary frame, said latter axis of rotation being situated on the same side of said pivot axis as the axis of rotation of said friction pulley, but at a smaller distance therefrom, a friction disc having an annular hub engaging said bearing means in said base frame for rotation therein, said friction disc being situated on the side of said bearing means facing said pivot axis of said secondary frame, a power transmission element arranged on the opposite side of said bearing means and secured to said annular hub of said friction disc for rotation therewith, said friction disc and said power transmission element having aligned central apertures, said annular hub being formed with radial slots extending through the circumferential wall of said hub, said friction disc being formed substantially as a spheroidic, bowl-shaped body an arc-shaped generatrix of which has its center on said pivot axis of said secondary frame, the concave side of said friction disc being frictionally engaged by the conical end face of said friction pulley.

7. An infinitely variable friction gear comprising a base frame, a secondary frame mounted for pivoting movement in said base frame, an electric motor mounted in said secondary frame with its axis at right angles to and spaced from the pivot axis of said secondary frame, a friction pulley secured to the shaft of said motor and having a substantially conical end face engaging a friction disc mounted in said base frame for rotation about an axis at right angles to and spaced from the pivot axis of said secondary frame, the axis of rotation of said friction disc being situated on the same side of said pivot axis as the axis of said motor, but at a smaller distance therefrom, said friction disc being formed substantially as a spheroidic, bowl-shaped body an arc-shaped generatrix of which has its center on said pivot axis, and means connected with said friction disc for transmitting power therefrom.

8. An infinitely variable friction gear comprising a base frame, a secondary frame mounted for pivoting movement in said base frame, an electric motor mounted in said secondary frame with its axis at right angles to and spaced from the pivot axis of said secondary frame and having its housing adapted to effect limited rotary movement about its axis and limited axial displacement relative to said secondary frame, a friction pulley secured to the shaft of said motor and having a substantially conical end face, a substantially spheroidic, bowl-shaped friction disc mounted in said base frame for rotation about an axis at right angles to and spaced from the pivot axis of said secondary frame, the axis of rotation of said friction disc being situated on the same side of said pivot axis as the axis of said motor, but at a smaller distance therefrom, co-acting cam means associated with said secondary frame and the housing of said motor for effecting axial displacement of said motor and said friction pulley under the action of reactive torque of said motor to cause said friction pulley to frictionally engage the concave side of said bowl-shaped friction disc, and means connected with said friction disc for transmitting power therefrom.

9. An infinitely variable friction gear comprising a base frame, a secondary frame mounted for pivoting movement in said base frame, an electric motor mounted in said secondary frame with its axis at right angles to and spaced from the pivot axis of said secondary frame, a friction pulley secured to the shaft of said motor and having a substantially conical end face, a cooling air intake in the housing of said motor adjacent said friction pulley, said friction pulley being axially recessed and formed with radial slots extending to the circumference thereof to constitute a cooling fan, bearing means in said base frame defining an axis of rotation at right angles to and spaced from the pivot axis of said secondary frame, said axis of rotation being situated on the same side of said pivot axis as the axis of said motor and said pulley, but at a smaller distance therefrom, a substantially spheroidic, bowl-shaped friction disc formed on its convex side with an annular hub engaging said bearing means in said base frame for rotation therein, said bowl-shaped friction disc being situated on the side of said bearing means facing said pivot axis of said secondary frame, a power transmission element arranged on the opposite side of said bearing means and secured to said annular hub of said friction disc for rotation therewith, said friction disc and said power transmission element having aligned central aperatures, said annular hub being formed with radial slots extending through the circumferential wall of said hub, and means for causing said friction pulley to frictionally engage the concave face of said bowl-shaped friction disc with its conical end face for imparting rotary movement to said friction disc and said power transmission element.

References Cited in the file of this patent

UNITED STATES PATENTS

| | | |
|---|---|---|
| 2,570,493 | Schmidt | Oct. 9, 1951 |
| 2,617,309 | Casson et al. | Nov. 11, 1952 |
| 2,842,973 | Crowe | July 15, 1958 |